(12) United States Patent
Iyer et al.

(10) Patent No.: US 12,444,946 B2
(45) Date of Patent: Oct. 14, 2025

(54) MODULAR POWER CONVERTER WITH DC CORRECTION

(71) Applicant: Smart Wires Inc., Durham, NC (US)

(72) Inventors: Amrit Iyer, St. Petersburg, FL (US); Mahsa Ghapandar Kashani, Redwood City, CA (US); Muhammad Fahad Ijaz, Lahore (PK)

(73) Assignee: Smart Wires Inc., Durham, NC (US)

( * ) Notice: Subject to any disclaimer, the term of this patent is extended or adjusted under 35 U.S.C. 154(b) by 228 days.

(21) Appl. No.: 18/355,239

(22) Filed: Jul. 19, 2023

(65) Prior Publication Data

US 2024/0030709 A1   Jan. 25, 2024

(30) Foreign Application Priority Data

Jul. 20, 2022  (PK) .................................... 466/2022

(51) Int. Cl.
*H02J 3/18* (2006.01)
(52) U.S. Cl.
CPC ................... *H02J 3/1807* (2013.01)
(58) Field of Classification Search
CPC .............................. H02J 3/1807; H02J 3/1814
See application file for complete search history.

(56) References Cited

U.S. PATENT DOCUMENTS

| | | | | |
|---|---|---|---|---|
| 5,198,746 A | * | 3/1993 | Gyugyi | H02J 3/1814 363/39 |
| 6,331,765 B1 | * | 12/2001 | Yamamoto | G05F 1/70 323/210 |
| 10,700,597 B1 | * | 6/2020 | Eckhardt | H02J 3/1814 |
| 11,342,749 B1 | * | 5/2022 | Moodie | H02J 3/1814 |
| 2020/0328594 A1 | * | 10/2020 | Ginart | H02J 3/26 |
| 2020/0328598 A1 | * | 10/2020 | Ginart | H02J 3/01 |

FOREIGN PATENT DOCUMENTS

| | | |
|---|---|---|
| KR | 10-2015-0058267 A | 5/2015 |
| WO | 2014/035881 A1 | 3/2014 |

\* cited by examiner

*Primary Examiner* — Harry R Behm
(74) *Attorney, Agent, or Firm* — Womble Bond Dickinson (US) LLP

(57) ABSTRACT

A modular power converter is operable to mitigate a DC component of injection onto a power transmission line. The modular power converter includes a pulse width modulation (PWM)-controlled generator, a voltage emulator, and a control circuit. The PWM-controlled generator includes drivers and a coupling capacitor. The PWM-controlled generator is to store voltage on the coupling capacitor and inject a voltage of the converter, which includes the DC component of injection, onto the power transmission line. The voltage emulator is to determine a DC measurement emulating the voltage of the converter, as a time-varying average value that is based on summing generator driver-state weighted values of the voltage on the coupling capacitor. The control circuit is to generate PWM pulses to operate the PWM-controlled generator and adjust timing of the PWM pulses, based at least on the DC measurement from the voltage emulator to counter-balance the DC component of injection.

14 Claims, 10 Drawing Sheets

- Fourier decomposition
- $I(t) = I_{DC} + I_L \cos(\omega t + \delta)$
- To compute the Voltage in the capacitor by superposition
- $V_C(t) = 1/C \int I(t)\, dt$
- $Vc_{DC}(t) = \int I_{DC}\, dt$
- $Vc_{AC}(t) = \int I_L \cos(\omega t + \delta)\, dt$

MODULAR POWER CONVERTER WITH DC CORRECTION

CROSS-REFERENCE TO RELATED APPLICATIONS

This application claims the benefit of Pakistan Patent Application No. 466/2022 filed on Jul. 20, 2022, the disclosure of which is incorporated herein by reference.

TECHNICAL FIELD

Embodiments of the application relate to mitigation of direct current (DC) injection by power flow control systems in power transmission lines.

BACKGROUND

Power flow control systems include modular converters for injecting reactive power into power transmission lines. The converters are connected in series and typically do not have the benefit of transformer isolation. Accordingly, methods are desired to measure the amount of DC injection and remove it via adjustments to the modular converters.

DETAILED DESCRIPTION

A modular power converter is operable to mitigate a DC component of injection onto a power transmission line. One embodiment includes a coupling capacitor for storing a voltage to be injected onto the power transmission line; a pulsed square-wave generator that has four high-current drivers for connecting the voltage stored on the coupling capacitor to the power transmission line using pulse width modulation; an apparatus that measures an average injected DC component; and, a control circuit that adjusts the timing of generated pulses to counter-balance the average injected DC component.

Figure 1:
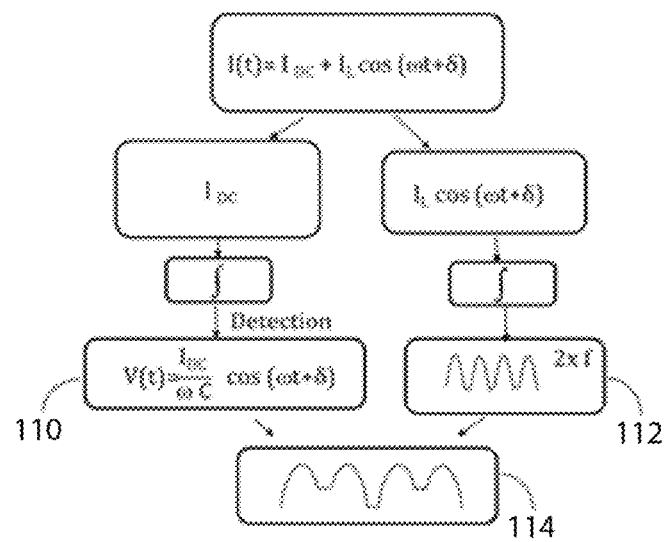
FIG. 1 is a diagram illustrating a prior art Fourier transformation decomposition model for a DC injection component.

FIG. 1 is a diagram illustrating a prior art model based on Fourier transformation decomposition of the line current flowing on a power transmission line. The voltages can be integrated separately and then summed together as shown. The DC injection component is manifested as a line-frequency piecewise sinusoidal wave 110. This voltage component is then superposed onto the capacitor voltage, shown as twice the line-frequency (2× f) wave 112. The resultant superposition is shown in 114.

Figure 2:
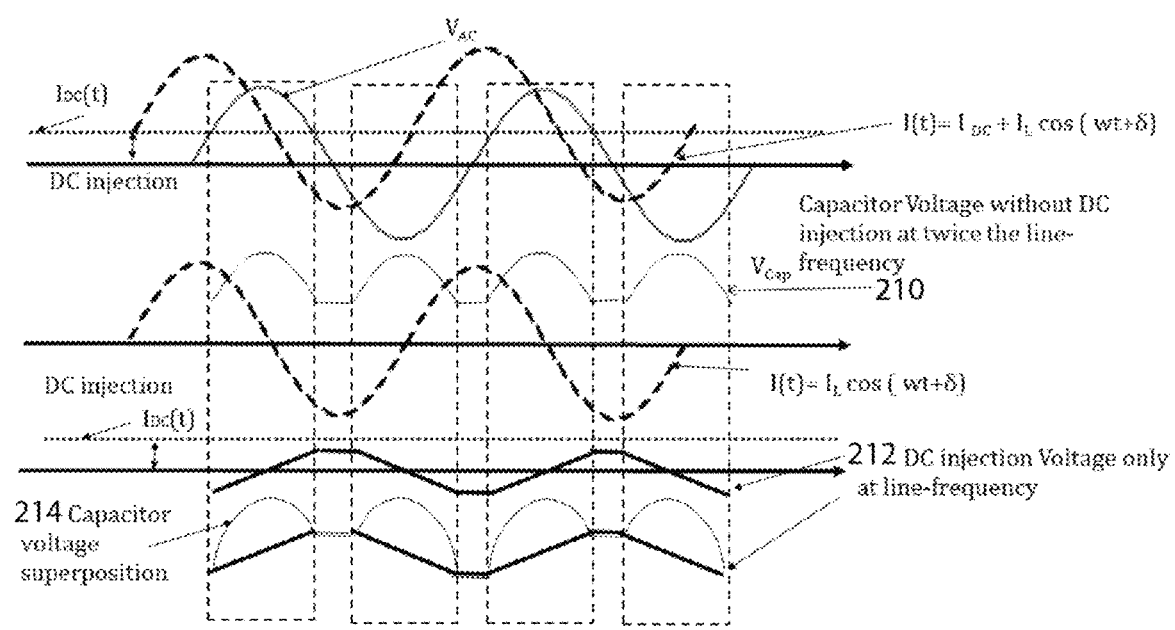
FIG. 2 is a diagram illustrating a prior art superposition of the DC injection component on a coupling capacitor's voltage waveform.

FIG. 2 is a diagram illustrating prior art integration of waveforms shown mathematically in FIG. 1. In FIG. 2, capacitor voltage Vcap without the DC component superimposed is labeled capacitor voltage without DC injection at twice the line frequency 210. The DC component is labeled 212. The superposition is labeled capacitor voltage superposition 214.

Figure 3:
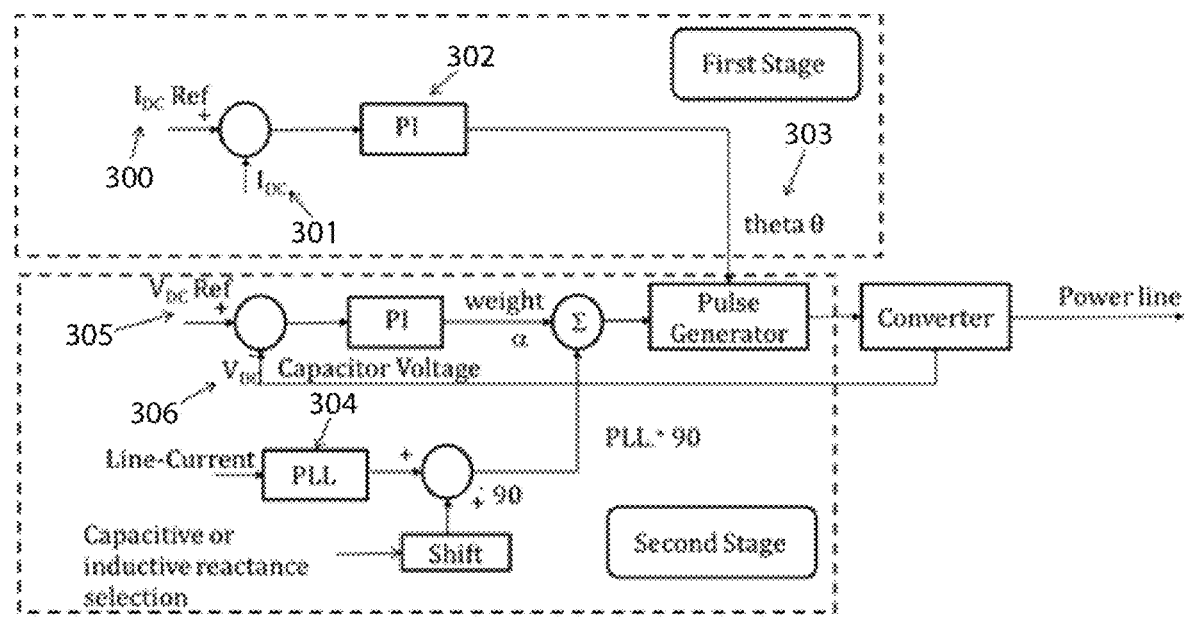
FIG. 3 is a block diagram illustrating a prior art two-stage control circuit for computing a correction angle θ as a function of DC injection and applies the correction angle computation to generate a pulsed square wave for the modular converter.

FIG. 3 is a block diagram illustrating a prior art two-stage control circuit for mitigating the injected DC component. The first stage is shown in the upper block, where the line current Inc 301 is used directly to compute a correction angle 303 (θ). This correction angle computation block compares the DC current in the line Inc 301 with a reference Inc Ref value 300 and then uses a proportional integrator (PI) controller 302 to compute the correction angle 303 for the pulsed square wave generator. This correction angle 303 is then fed to the second stage circuit in the lower block to generate the required timings for the pulsed square wave.

In the second stage circuit, that is, the pulsed square wave generation block, the voltage across the coupling capacitor 306 ($V_{DC}$) is first compared with a reference voltage 305 ($V_{DC}$ Ref) and fed into a proportional integrator (PI) controller to be added later with a weighting factor α. A phase-locked loop (PLL) circuit 304 locks on the line current with the shift input (leading or lagging phase), that is, capacitive or inductive reactance selection, and is then added with the output of the previously described PI output to determine the frequency and amplitude of the pulsed square wave. The timing adjustment on the leading and trailing edges come from the correction angle 303. This correction angle 303 normally ranges from 0 to 90 degrees. With the boundary conditions, when the correction angle 303 is zero degrees, the pulsed square wave has no timing adjustments for the leading and trailing edges. That is, the pulsed square wave is not modified.

Figure 4:
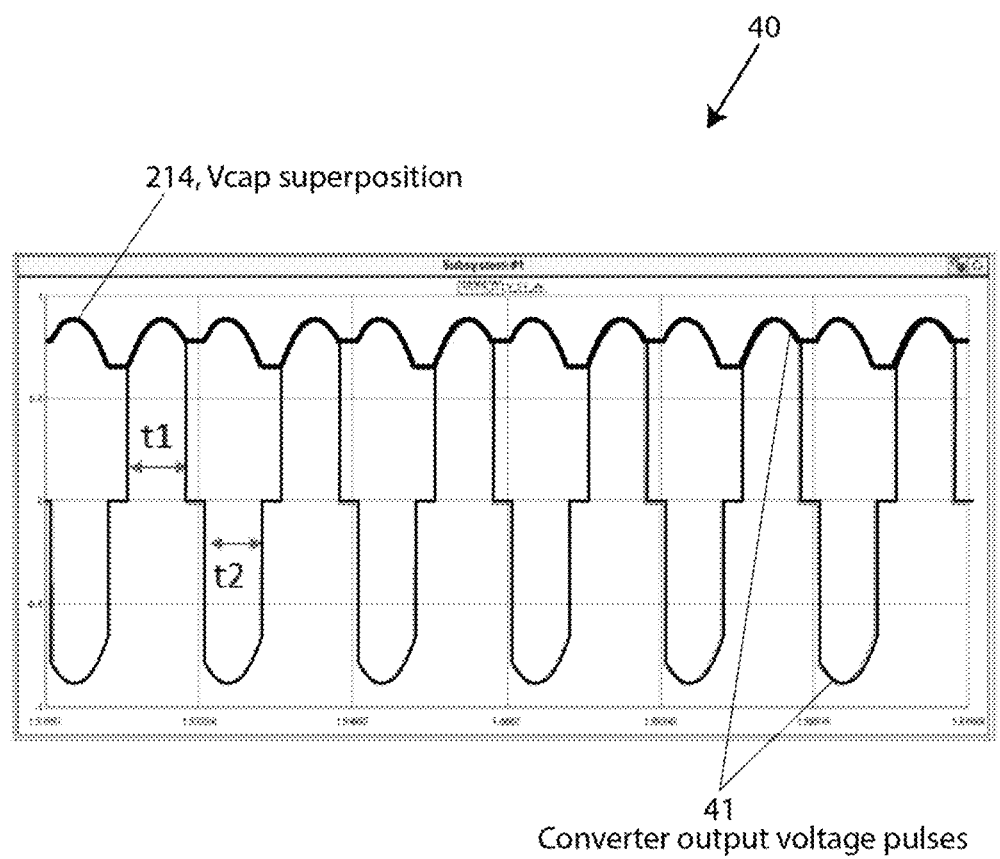
FIG. 4 is a diagram illustrating timing of positive and negative converter output voltage pulses for mitigating the DC injection component according to an embodiment.

FIG. 4 is a diagram illustrating an injection waveform 40 having widths t1 and t2 for the converter output driver pulses 41, derived from the correction angle 303, and shown in relation to the piece-wise sinusoidal waveform 214 of FIG. 2 according to an embodiment.

Figure 5:
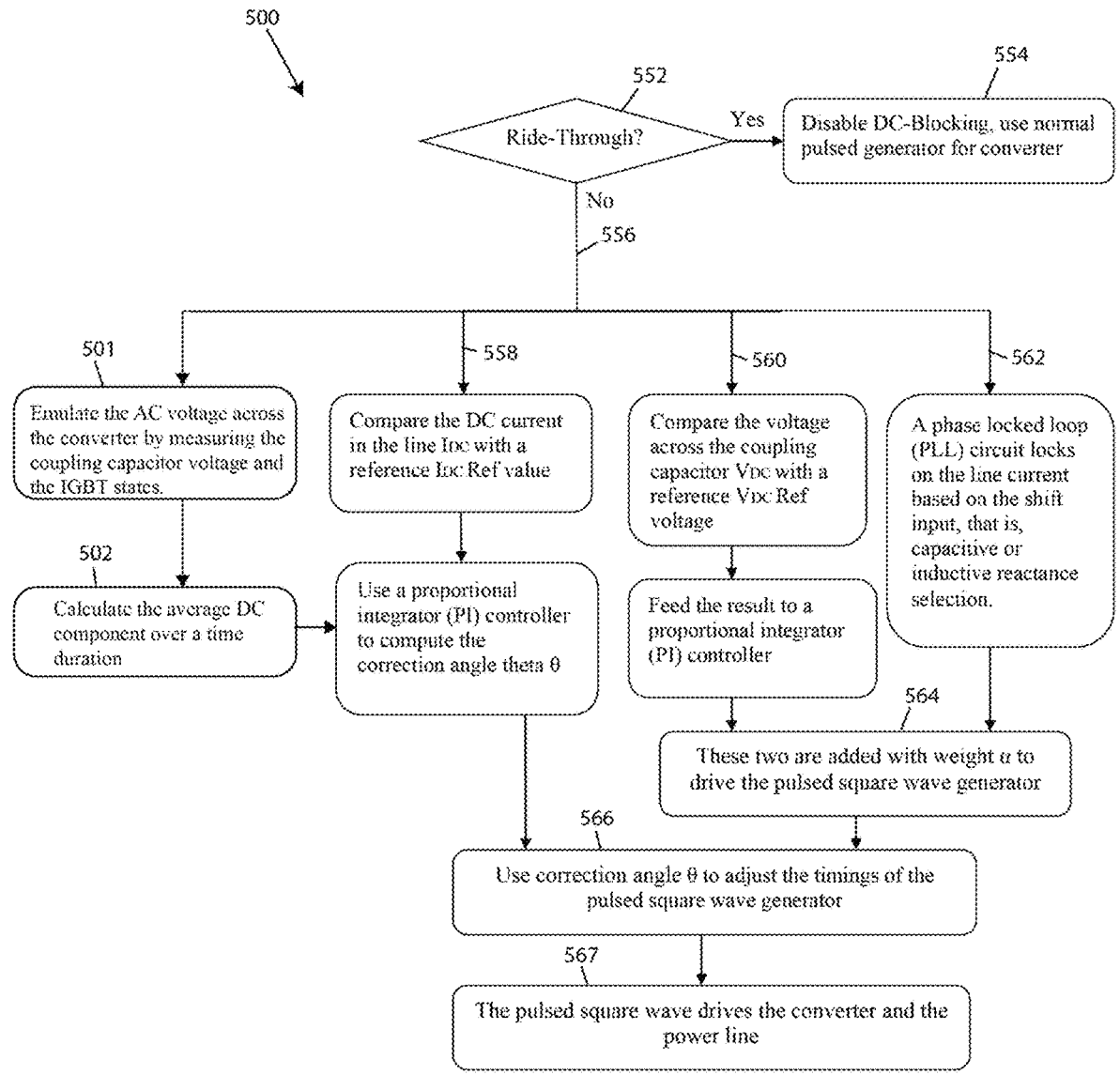
FIG. 5 is a flow diagram of a process for mitigating the DC injection component according to an embodiment.

FIG. 5 is a flow diagram of a process 500 for mitigating the DC injection component according to an embodiment. Block 501 includes emulating the AC voltage across the converter by measuring the coupling capacitor voltage and the IGBT states. Block 502 includes calculating the average DC component over a time duration. Depending on the configuration setting (at block 552) for "ride-through" feature, the process can either disable the so-called DC-blocking capability at block 554, that is, the mitigation control circuit, or enable the DC-blocking (at branch 556) with the control circuit shown in FIG. 8. In one embodiment of the "ride-through" mode, the two-stage control circuit of FIG. 8 does not adjust the timing of the pulsed square waves, for example by forcing the correction angle (θ) to zero, when the converter drives the power line. The first stage of the two-stage control circuit is in the branch 558 while the second stage follows the branch 560 and branch 562 concurrently. The second stage branches 560 and 562 combine the weighted sum results of capacitor voltage deviation and line current deviation to feed to block 564 to generate a pulsed square wave for the converter. The first stage branch 558 computes concurrently the correction angle θ (see FIGS. 3 and 8) to feed that to block 566 to generate pulsed square wave with appropriate timings, and further to block 567 to drive the converter and the power line.

Figure 6A:
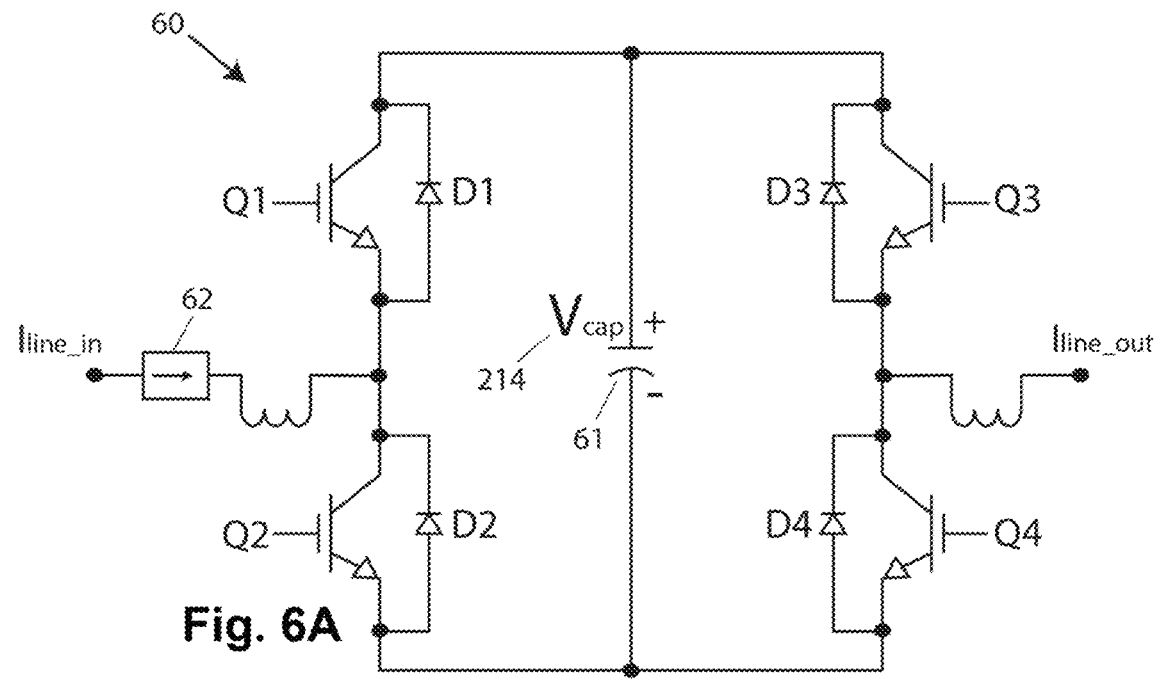
FIGS. 6A-6C are diagrams illustrating injection waveform to states of four high-current drivers, Q1, Q2, Q3, Q4, of a square wave generator according to an embodiment.

FIG. 6A is a diagram illustrating a pulsed square wave generator 60 comprising four high-current drivers according to an embodiment. Further embodiments could use other types of drivers, including semiconductor drivers with various types, numbers and arrangements of various types of transistors in various technologies. In some embodiments, the high-current drivers may be IGBT drivers. The line current input and output are shown. Coupling capacitor 61 is shown, together with the voltage across the coupling capacitor, Vcap 214. A line current sensor 62 is shown. As will be further described in relation to FIG. 6B, each of the elements Q1, D1, Q2, D2, Q3, D3, Q4, D4 can conduct at different times to implement the pulsed square-wave generator. In one embodiment, four drivers and a coupling capacitor 61 are arranged in an H-bridge. A line current sensor and an inductor are in series between a line in terminal and one terminal of the H-bridge. Another inductor is in series between another terminal of the H-bridge and a line out terminal. The coupling capacitor 61 is across the crossbar of the H-bridge.

Figure 6B:
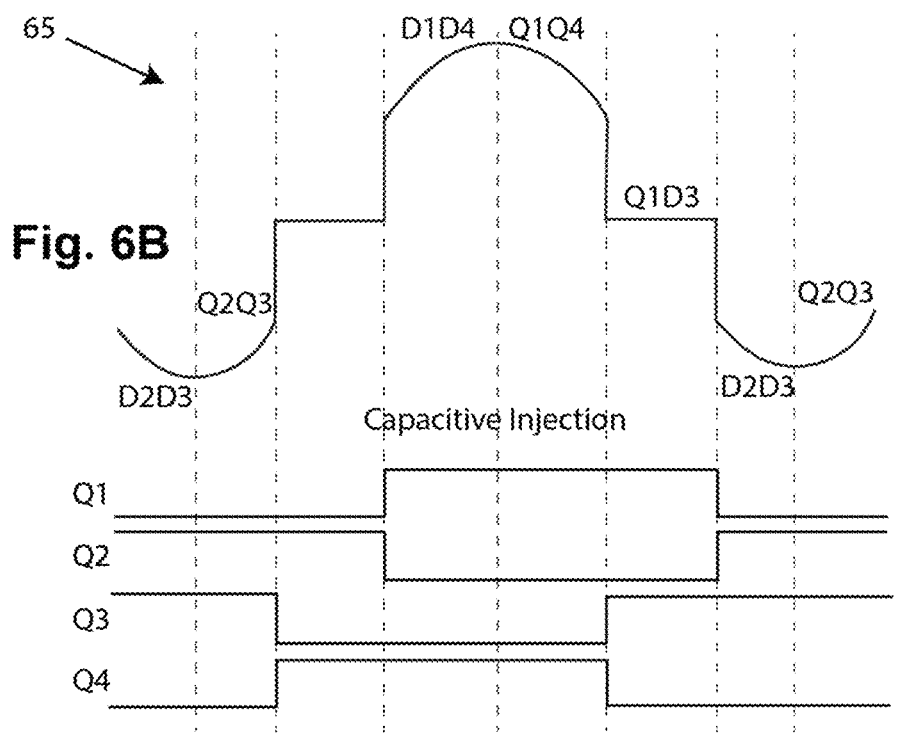

FIG. 6B is a diagram illustrating an emulated voltage 65 for capacitive injection according to an embodiment. The emulated voltage 65 depends on states of the IGBT drivers, as shown by the Boolean expressions for each segment of the waveform, in an embodiment of the present disclosure. As an example, the Boolean expression "Q1D3" conveys the condition that both Q1 and D3 are conducting. Reading from left to right, and forwards in time, across the waveform and the segments of the waveform denoted by dashed lines, is as follows, according to the pulses of signals driving the respective control terminals of the respective drivers Q1, Q2, Q3 and Q4, depicted in the lower region in FIG. 6B. In the segment denoted by Boolean expression "D2D3", D2 and D3 are conducting or "on". In the segment denoted by "Q2Q3", Q2 and Q3 are conducting or "on". In the next segment, with no Boolean expression, Q2 and Q4 are conducting or "on". In the segment denoted by "D1D4", D1 and D4 are conducting or "on". In the segment denoted by "Q1Q4", Q1 and Q4 are conducting or "on". In the segment denoted by "Q1D3", Q1 and D3 are conducting or "on". In the segment denoted by "D2D3", D2 and D3 are conducting or "on". In the segment denoted by "Q2Q3", Q2 and Q3 are conducting or "on".

Figure 6C:
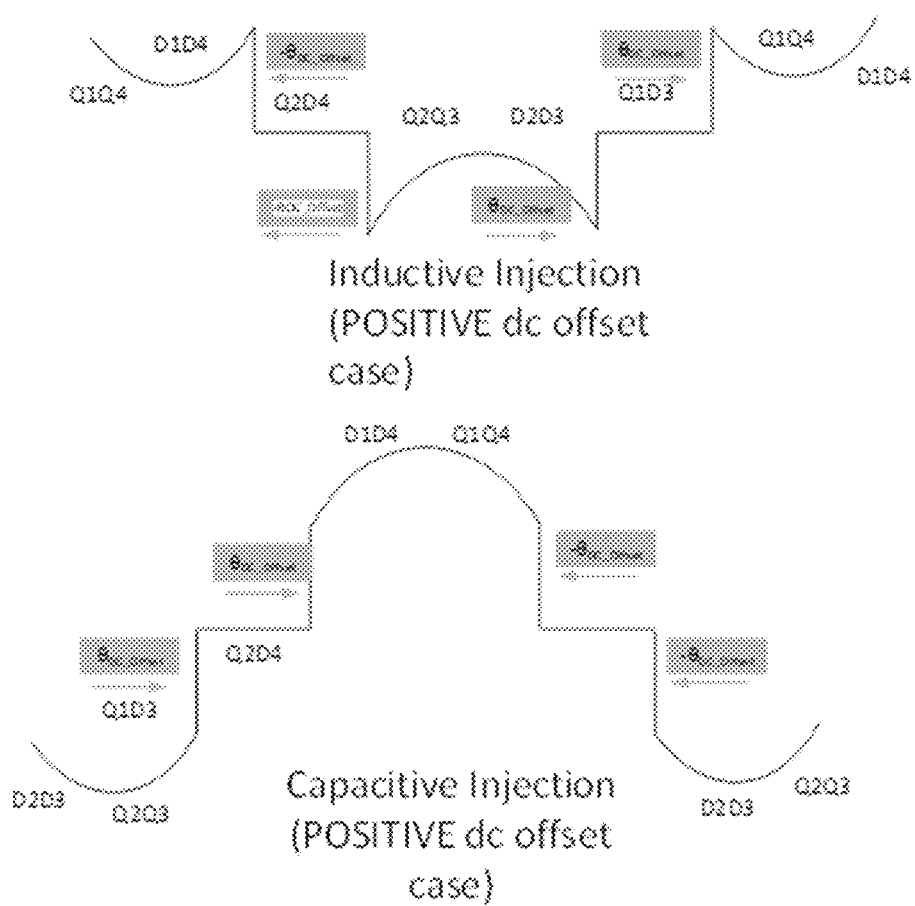

FIG. 6C is a diagram illustrating inductive injection, the positive DC offset case (upper waveform in FIG. 6C), and capacitive injection, the positive DC offset case (lower waveform in FIG. 6C). The diagram illustrates how theta adjustment is done for DC offset. Theta from embodiment 83 is a measure of correction factor to be applied to resulting PWMs generated by embodiment 60. Instead of generating balanced PWMs for both positive and negative half cycles, asymmetric PWMs are generated for positive and negative half cycles scaled by theta. FIG. 6C shows how pulse widths are modified in this process. For a positive DC offset, positive pulse width is reduced, and negative pulse width is increased for both capacitive and inductive injection. For negative DC offset, pulse width for positive cycles are increased by factor of theta and negative pulses are reduced by a factor of theta. For positive cycle and positive DC offset, effective turn ON time of positive pulse in FIG. 6C is delayed by theta and effective turn OFF time of positive pulse is reduced by theta resulting in reduced turn ON time of positive pulse for both capacitive and negative injection pulses and vice versa for negative DC offset.

Figure 7:
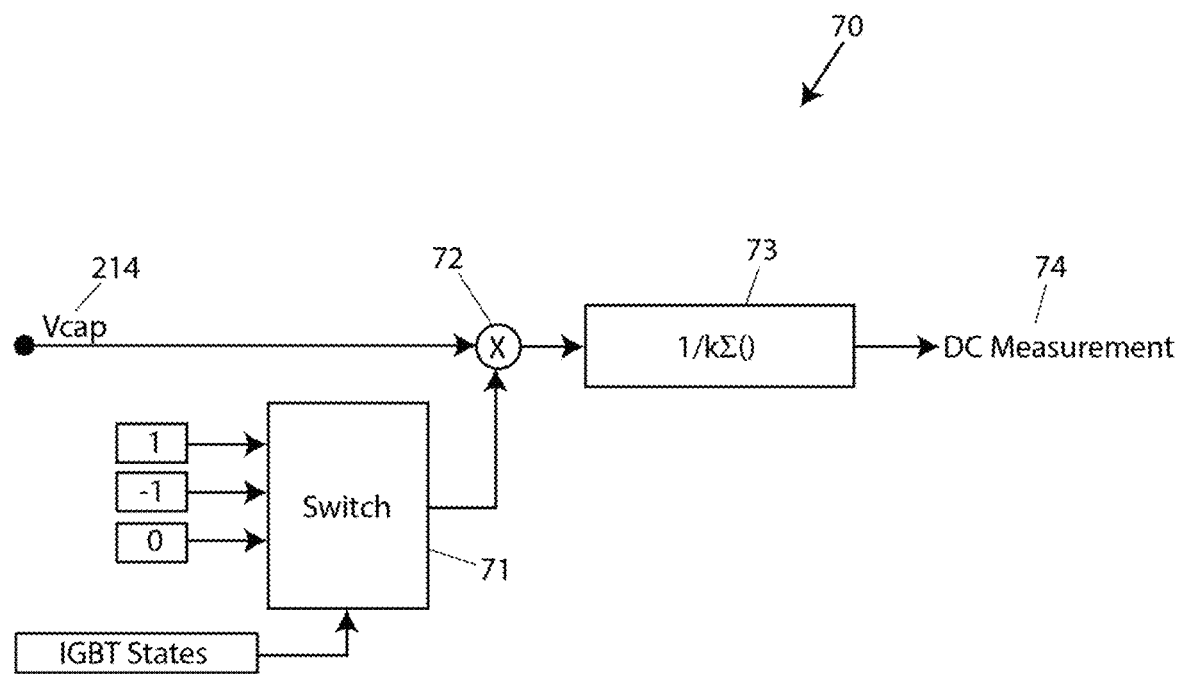
FIG. 7 is a block diagram illustrating a system for making a DC measurement according to an embodiment.

FIG. 7 illustrates a circuit diagram 70 for generating an emulated voltage which is input to the DC measurement block 74 according to an embodiment. The IGBT states described in reference to FIG. 6B are input to a switch 71 that outputs to a multiplier 72 with a second input from Vcap 214. The output of multiplier 72 passes to a summing circuit 73 that calculates an average value. The output of summing circuit 73 is the DC Measurement 74. For example, the summing circuit 73 may sum a number k of outputs of the multiplier 72, and divide by the number k to determine an average value for the DC measurement 74, which is a time varying average value.

Figure 8:
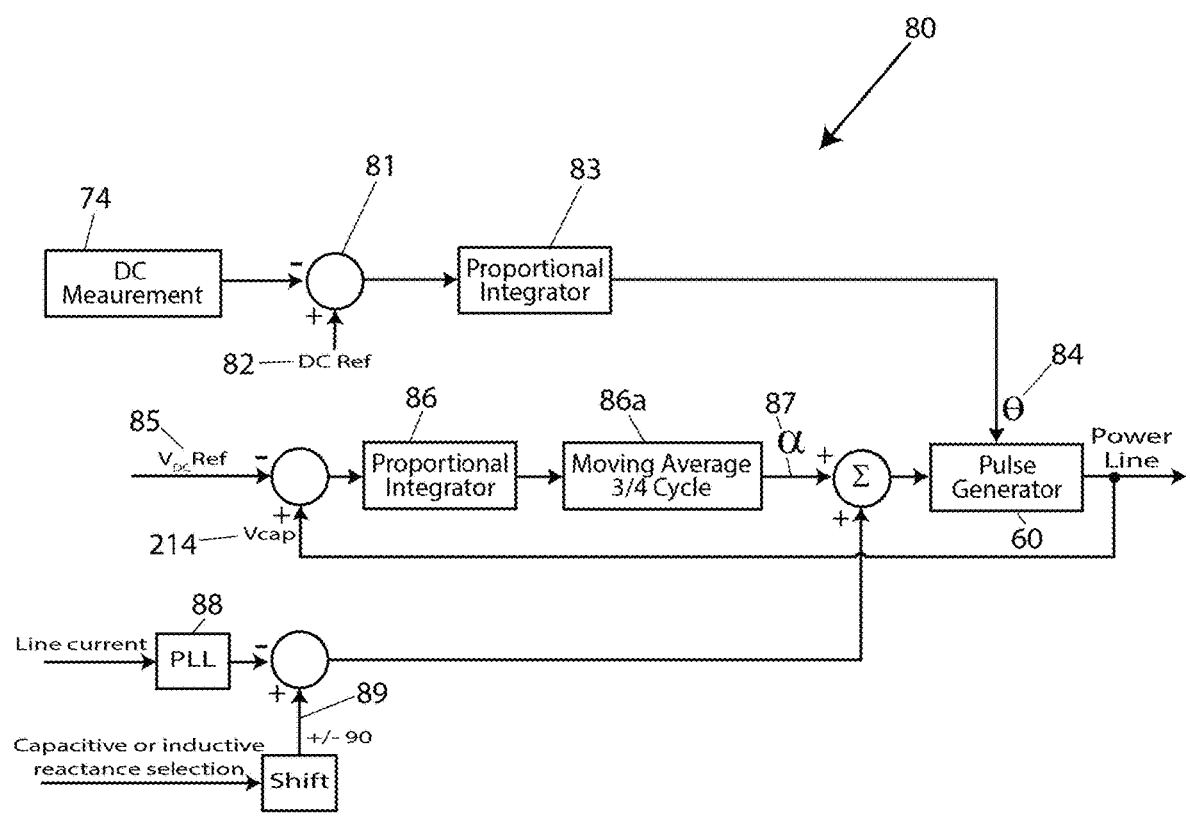
FIG. 8 is a block diagram illustrating a control circuit for mitigating the DC current component in a line current according to an embodiment.

FIG. 8 illustrates a control diagram of a modular power converter 80 according to an embodiment. In various embodiments, the control diagram of FIG. 8 is implemented in a processor, for example, software executing in a processor, digital circuitry, analog circuitry, or combinations thereof. To compute correction angle 84 (θ), the DC Measurement 74, described in FIG. 7, is compared in comparator 81 with a reference value, $DC_{REF}$ 82. $DC_{REF}$ 82 may be set to zero for example. The output of comparator 81 is input to proportional integrator 83 having the output correction angle 84 (θ).

Correction angle 84 (θ) is fed to a pulse generator 60 to generate the pulsed square wave, which is passed to the IGBT drivers to drive the power line.

The voltage across the coupling capacitor 214 (Vcap) is compared with Vic Ref voltage 85 and fed into proportional integrator (PI) 86 to create weighting factor 87 (α). In one embodiment, as shown in FIG. 8, there is a low pass filter 86a on the output of the proportional integrator 86, creating weighting factor 87 (α) as a low pass filtered output of the proportional integrator 86. Low pass filter 86a is labeled "Moving Average 3/4 Cycle" in FIG. 8. A DC voltage 214 with 120 Hz signal superimposed is compared against fixed reference 85 which may result in an error comprising 120 Hz ripple. This error may be filtered by proportional integrator 86 to reduce DC offset. The remaining DC offset may be reduced by a DC offset removal loop in the creation of correction angle 84 (θ). In one embodiment, the low pass filter 86a is used in the case of inductive mode, and not used in the case of capacitive mode (see FIG. 6C). A phase-locked loop (PLL) circuit 88 locks on the line current with a shift input 89 (leading or lagging phase), for example, capacitive or inductive reactance selection (see FIG. 6C), and summed with the weighting factor 87 (α) to determine the frequency and amplitude of the pulsed square wave. Shift 89, for capacitive or inductive reactance selection, can be +/−90°, corresponding to capacitive reactance selection (+90°) and reactance selection (−90°). The timing adjustments on the leading and trailing edges of the pulsed square wave are derived from the correction angle 84 (θ), which may range from 0 to 90 degrees. When the correction angle 84 (θ) is zero degrees, the pulsed square wave may have no timing adjustments for the leading and trailing edges, i.e., the pulsed square wave is not modified. When the correction angle 84 (θ) is 90 degrees, one half of the square wave may be eliminated. In one embodiment, for the correction angle 84 (θ) a math operator is the inner product of two vectors: $a \cdot b = |a||b|\cos \theta$. Note that when the correction angle 84 θ is zero degrees, cos θ=1, and the output (injection) is multiplied. When the correction angle 84 (θ) is 90 degrees, cos θ=zero, and one half of the injected waveform "goes away".

Pulse generator 60 adjusts the leading and trailing edges of the pulsed square wave, by generating control signals Q1, Q2, Q3, Q4 (see FIG. 6A) based on the correction angle 84 (θ), and may be implemented similarly to the pulse generator in FIG. 3 (prior art), or variation thereof. For example, pulse generator 60 could use phase modulation and/or pulse width modulation to adjust timing of control signals Q1, Q2, Q3, Q4, controlled by the correction angle 84 (θ), in various embodiments. For example, pulse generator 60 could use frequency modulation, phase modulation and/or pulse width modulation to generate control signals Q1, Q2, Q3, Q4 that adjust frequency and amplitude of the pulsed square wave, controlled by the weighting factor 87 (α), in various embodiments.

Figure 9:
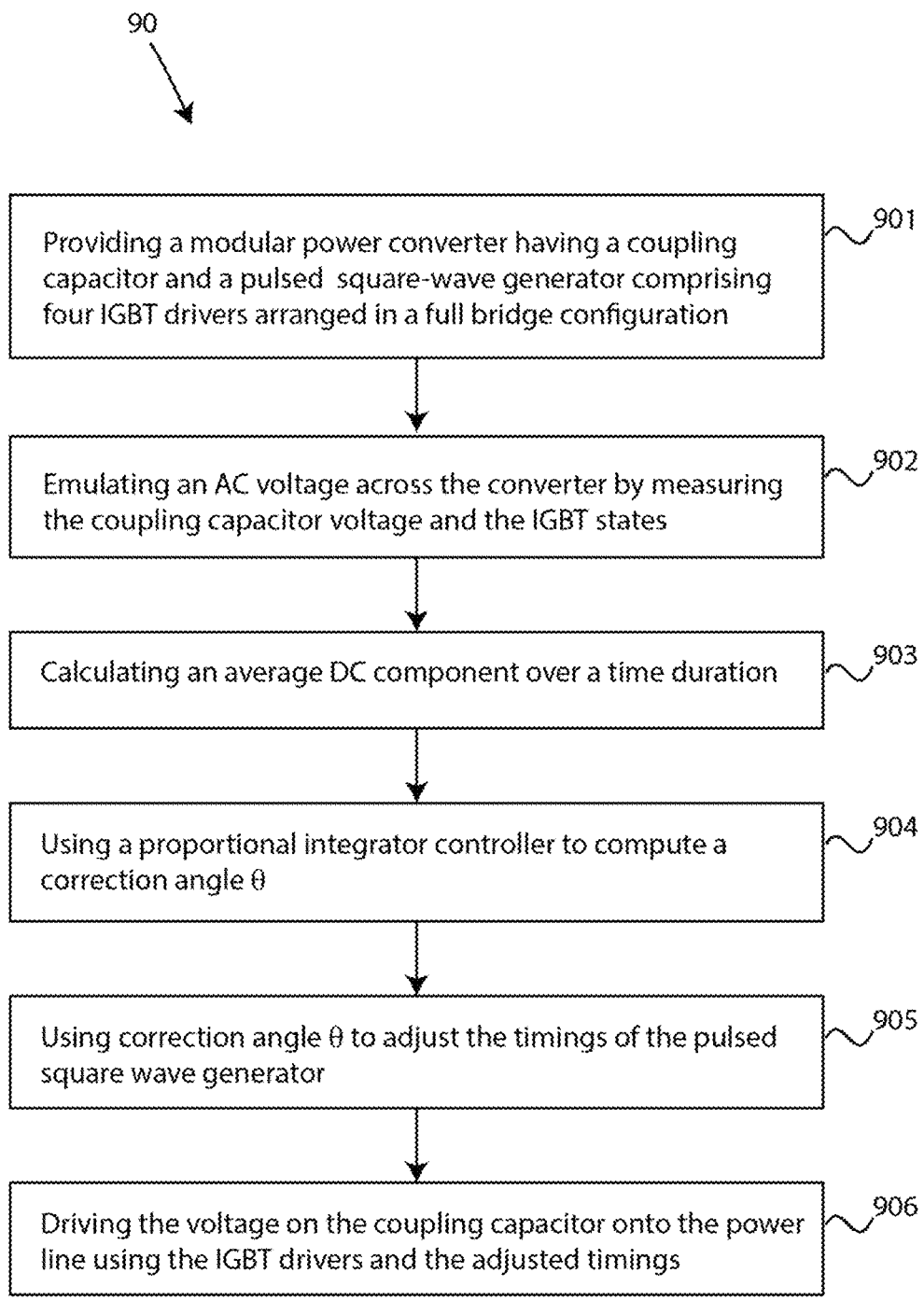
FIG. 9 is a flow diagram of a process for mitigating injection of a DC component into a power line using a correction angle θ, according to an embodiment.

FIG. 9 is a flow diagram of a process 90 for mitigating an injected DC component according to an embodiment. Referring to FIG. 9, at block 901, a modular power converter is provided, with the power converter having a coupling capacitor and a pulsed square wave generator comprising four IGBT drivers arranged in a full-bridge configuration. At block 902, an AC voltage is emulated across the power converter by measuring a coupling capacitor voltage and the IGBT states. At block 903, an average DC component is calculated over a time duration. At block 904, a proportional integrator is used to compute a correction angle θ. At block 905, the correction angle θ is used to adjust timings of the pulsed square wave generator. At block 906, voltage on the coupling capacitor is driven onto the power line using the IGBT drivers and the adjusted timings.

The methods, devices, processing, and logic described above may be implemented in many different ways and in many different combinations of hardware and software. For example, electronic circuitry or a controller may be configured with hardware and/or firmware to perform the various functions described. All or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples. The implementations may be distributed as circuitry among multiple system components, such as among multiple processors and memories, optionally including multiple distributed processing systems.

The circuitry may further include or access instructions for execution by the circuitry. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium.

The foregoing description, for purposes of explanation, uses specific nomenclature to provide a thorough understanding of the application. However, it will be apparent to one skilled in the art that specific details are not required in order to practice the embodiments of the application. Thus, the foregoing descriptions of specific embodiments of the application are presented for purposes of illustration and description. They are not intended to be exhaustive or to limit the application to the precise forms disclosed; obviously, many modifications and variations are possible in view of the above teachings. The embodiments were chosen and described in order to best explain the principles of the application and its practical applications. They thereby enable others skilled in the art to best utilize the application and various embodiments with various modifications as are suited to the particular use contemplated. The examples are thus illustrative and non-limiting. It is intended that the following claims and their equivalents define the scope of the application.

What is claimed is:

1. A modular power converter, operable to mitigate a direct current (DC) component of injection onto a power transmission line, the modular power converter comprising:
  a pulse width modulation (PWM)-controlled generator comprising a plurality of drivers and a coupling capacitor, to store voltage on the coupling capacitor and inject a voltage of the converter, which includes the DC component of injection, onto the power transmission line;
  a voltage emulator, to determine a DC measurement emulating the voltage of the converter, the DC measurement as a time-varying average value that is based on summing of generator driver-state weighted values of the voltage on the coupling capacitor; and
  a control circuit to generate PWM pulses to operate the PWM-controlled generator and adjust timing of the PWM pulses, based at least on the DC measurement from the voltage emulator, to counter-balance the DC component of injection;
  wherein the voltage emulator is to determine the DC measurement comprises:
  the voltage emulator is to multiply weights of 1, −1, or 0, by the voltage on the coupling capacitor according to switching states of the drivers of the PWM-controlled generator to determine the generator driver-state weighted values of the voltage on the coupling capacitor, and sum results of the multiplying to determine the time-varying average value that is emulating the voltage of the converter, formed as the DC measurement; or
  the voltage emulator, based on the summing of the generator driver-state weighted values of the voltage on the coupling capacitor, is to produce a predicted voltage waveform comprising waveform segments associated with a Boolean combination of the switching states of the drivers of the PWM-controlled generator, with the DC measurement comprising the time-varying average value of the predicted voltage waveform.

2. The modular power converter of claim 1, wherein the control circuit comprises:
  at least one of a processor, digital circuitry, or analog circuitry, to:
    compare the DC measurement to a DC reference current to determine a first comparison output;
    input the first comparison output to a first proportional integrator (PI) to determine a correction angle;
    compare the voltage on the coupling capacitor to a DC reference voltage to determine a second comparison output;

input the second comparison output to a second proportional integrator (PI), to determine a weighting factor alpha;
lock a phase locked loop (PLL) on a line current with a shift input that is leading or lagging phase to determine a capacitive or inductive reactance selection;
sum the capacitive or inductive reactance selection and the weighting factor alpha to determine frequency and amplitude of a pulsed wave; and
generate the PWM pulses, having leading and trailing edges derived from the correction angle and having the determined frequency and amplitude according to the weighting factor alpha.

3. The modular power converter of claim 1, wherein
the PWM-controlled generator comprises the drivers and the coupling capacitor arranged in an H-bridge, and a line in terminal and a line out terminal, to connect in series onto the power transmission line;
a line current sensor and a first inductor in series between the line in terminal and a first terminal of the H-bridge; and
a second inductor in series between a second terminal of the H-bridge and the line out terminal.

4. The modular power converter of claim 1, wherein:
the control circuit comprises a two-stage control circuit; and
the two-stage control circuit comprises comparators, proportional integrators, and a phase-locked loop (PLL).

5. The modular power converter of claim 1, wherein:
the control circuit includes a proportional integrator (PI) to compute a correction angle; and
the control circuit is to use the correction angle to adjust timings of the PWM pulses that are to operate the PWM-controlled generator.

6. The modular power converter of claim 1, wherein:
wherein the voltage emulator to determine the DC measurement further comprises the voltage emulator, based on the summing of the generator driver-state weighted values of the voltage on the coupling capacitor, is to determine an emulation of the DC component of injection as a piecewise sinusoidal ripple voltage at a line frequency of AC of the power line, with the DC measurement comprising the time-varying average value of the piecewise sinusoidal ripple voltage.

7. A method for mitigating a direct current (DC) component injected into a power transmission line, the method comprising:
operating a pulse width modulation (PWM)-controlled generator, comprising a plurality of drivers and a coupling capacitor, to store voltage on the coupling capacitor and inject a voltage, which includes the DC component of injection, onto the power transmission line;
determining, in a voltage emulator, a DC measurement emulating the voltage which is injected onto the power transmission line, the DC measurement as a time-varying average value that is based on summing generator driver-state weighted values of the voltage on the coupling capacitor;
generating, in a control circuit, PWM pulses to operate the PWM-controlled generator; and
adjusting, in the control circuit, timing of the PWM pulses, based at least on the DC measurement from the voltage emulator to counter-balance the DC component of injection;
wherein determining the DC measurement, in the voltage emulator, comprises:
multiplying weights of 1, −1, or 0, by the voltage on the coupling capacitor according to switching states of the drivers of the PWM-controlled generator to determine the generator driver-state weighted values of the voltage on the coupling capacitor, and summing results of the multiplying to determine the time-varying average value that is emulating the voltage of the converter, formed as the DC measurement; or
using the summing of the generator driver-state weighted values of the voltage on the coupling capacitor to produce a predicted voltage waveform comprising waveform segments associated with a Boolean combination of the switching states of the drivers of the PWM-controlled generator, with the DC measurement comprising the time-varying average value of the predicted voltage waveform.

8. The method of claim 7, wherein actions performed in the control circuit comprise:
comparing the DC measurement to a DC reference current to determine a first comparison output;
inputting the first comparison output to a first proportional integrator (PI) to determine a correction angle;
comparing the voltage on the coupling capacitor to a DC reference voltage to determine a second comparison output;
inputting the second comparison output to a second proportional integrator (PI), to determine a weighting factor alpha;
locking a phase locked loop (PLL) on a line current with a shift input that is leading or lagging phase to determine a capacitive or inductive reactance selection;
summing the capacitive or inductive reactance selection and the weighting factor alpha to determine frequency and amplitude of a pulsed wave; and
generating the PWM pulses, having leading and trailing edges derived from the correction angle and having the determined frequency and amplitude according to the weighting factor alpha.

9. The method of claim 7, wherein the control circuit comprises a two-stage control circuit comprising comparators, proportional integrators (PIs), and a phase-locked loop (PLL).

10. The method of claim 7, wherein adjusting, in the control circuit, comprises:
computing, through a proportional integrator (PI), a correction angle; and
using the correction angle to adjust timings of the PWM pulses that are to operate the PWM-controlled generator.

11. The method of claim 7, wherein determining the DC measurement, in the voltage emulator, further comprises:
using the summing of the generator driver-state weighted values of the voltage on the coupling capacitor, to determine an emulation of the DC component of injection as a piecewise sinusoidal ripple voltage at a line frequency of AC of the power line, with the DC measurement comprising the time-varying average value of the piecewise sinusoidal ripple voltage.

12. A tangible, non-transitory, computer-readable media having instructions stored therein, which when executed by one or more processors, cause the one or more processors to perform operations, the operations comprising:
operating a pulse width modulation (PWM)-controlled generator, comprising a plurality of drivers and a coupling capacitor, to store voltage on the coupling capacitor and inject a voltage, which includes the DC component of injection, onto the power transmission line;

determining, in a voltage emulator, a DC measurement emulating the voltage which is injected onto the power transmission line, the DC measurement as a time-varying average value that is based on summing generator driver-state weighted values of the voltage on the coupling capacitor;

generating, in a control circuit, PWM pulses to operate the PWM-controlled generator; and adjusting, in the control circuit, timing of the PWM pulses, based at least on the DC measurement from the voltage emulator, to counter-balance the DC component of injection;

wherein determining the DC measurement comprises:

multiplying weights of 1, −1, or 0, by the voltage on the coupling capacitor according to switching states of the drivers of the PWM-controlled generator to determine the generator driver-state weighted values of the voltage on the coupling capacitor, and summing results of the multiplying to determine the time-varying average value that is emulating the voltage of the converter, formed as the DC measurement; or using the summing of the generator driver-state weighted values of the voltage on the coupling capacitor to produce a predicted voltage waveform comprising waveform segments associated with a Boolean combination of the switching states of the drivers of the PWM-controlled generator, with the DC measurement comprising the time-varying average value of the predicted voltage waveform.

13. The tangible, non-transitory, computer-readable media of claim 12, wherein the operations further comprise:

comparing the DC measurement to a DC reference current to determine a first comparison output;

inputting the first comparison output to a first proportional integrator (PI) to determine a correction angle;

comparing the voltage on the coupling capacitor to a DC reference voltage to determine a second comparison output;

inputting the second comparison output to a second proportional integrator (PI), to determine a weighting factor alpha;

locking a phase locked loop (PLL) on a line current with a shift input that is leading or lagging phase to determine a capacitive or inductive reactance selection;

summing the capacitive or inductive reactance selection and the weighting factor alpha to determine frequency and amplitude of a pulsed wave; and generating the PWM pulses, having leading and trailing edges derived from the correction angle and having the determined frequency and amplitude according to the weighting factor alpha.

14. The tangible, non-transitory, computer-readable media of claim 12, wherein determining the DC measurement further comprises:

using the summing of the generator driver-state weighted values of the voltage on the coupling capacitor, to determine an emulation of the DC component of injection as a piecewise sinusoidal ripple voltage at a line frequency of AC of the power line, with the DC measurement comprising the time-varying average value of the piecewise sinusoidal ripple voltage.

* * * * *